United States Patent
Cappabianca et al.

(10) Patent No.: US 6,474,687 B2
(45) Date of Patent: *Nov. 5, 2002

(54) ONE-PIECE KNEE BOLSTER

(75) Inventors: Douglas Michael Cappabianca, Canton; Dale Paul Moore, Plymouth; Joseph A. Bollo, Harper Woods; Kumar Balakrishna Kulkarni, Ann Arbor; Ravi Thyagarajan, Novi; Venkat Reddy, Ypsilanti, all of MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,202

(22) Filed: Apr. 15, 1999

(65) Prior Publication Data

US 2001/0035640 A1 Nov. 1, 2001

(51) Int. Cl.[7] ............................................. B60R 21/045
(52) U.S. Cl. ........................................ 280/752; 280/751
(58) Field of Search ................................ 280/748, 750, 280/751, 752

(56) References Cited

U.S. PATENT DOCUMENTS

| 4,347,276 | A |   | 8/1982  | Weber et al. |
|-----------|---|---|---------|--------------|
| 4,349,214 | A |   | 9/1982  | Inasawa et al. |
| 4,805,924 | A | * | 2/1989  | Birchfield et al. ........... 280/752 |
| 4,834,422 | A |   | 5/1989  | Oikawa et al. |
| 4,946,192 | A |   | 8/1990  | Kuwahara |
| 5,071,162 | A | * | 12/1991 | Takagawa ..................... 280/752 |
| 5,098,124 | A | * | 3/1992  | Breed et al. ................. 280/751 |
| 5,370,417 | A | * | 12/1994 | Kelman et al. .............. 280/751 |
| 5,431,442 | A | * | 7/1995  | Tomita et al. ............... 280/752 |
| 5,518,270 | A | * | 5/1996  | Hanada et al. .............. 280/751 |
| 5,573,272 | A | * | 11/1996 | Teshima ...................... 280/751 |
| 5,632,507 | A | * | 5/1997  | Sinner et al. ................ 280/751 |
| 5,700,050 | A | * | 12/1997 | Gonas et al. ................ 296/189 |
| 5,749,193 | A | * | 5/1998  | Bucher ..................... 52/506.06 |
| 5,794,975 | A | * | 8/1998  | Nohr et al. .................. 280/753 |
| 5,882,037 | A | * | 3/1999  | Bauer et al. ................. 280/748 |
| 5,951,045 | A | * | 9/1999  | Almefelt et al. ............ 280/748 |
| 6,017,084 | A | * | 1/2000  | Carroll, III et al. .......... 296/189 |
| 6,142,522 | A | * | 11/2000 | Bossenmaier et al. ....... 280/752 |
| 6,186,546 | B1 | * | 2/2001 | Uhl .............................. 280/751 |

FOREIGN PATENT DOCUMENTS

| JP | 2225154 | 9/1990 |
| JP | 427631  | 1/1992 |

* cited by examiner

Primary Examiner—Brian L. Johnson
Assistant Examiner—L. Lum
(74) Attorney, Agent, or Firm—Brinks Hofer Gilson & Lione

(57) ABSTRACT

A one-piece knee bolster for a motor vehicle includes a knee bolster cover adapted to mount to vehicle structure in an interior of a motor vehicle and at least one hollow reinforcing channel member extending along the knee bolster cover to reinforce the knee bolster cover.

2 Claims, 2 Drawing Sheets

ONE-PIECE KNEE BOLSTER

BACKGROUND OF THE INVENTION

1. Field of the Invention

The present invention relates generally to knee bolsters for vehicles and, more specifically, to a one-piece knee bolster for an instrument panel on a motor vehicle.

2. Description of the Related Art

Knee bolsters are employed as interior components on motor vehicles. Typically, the knee bolster is mounted to an instrument panel on the motor vehicle. During a frontal impact of the motor vehicle, the knee bolster provides a first contact surface for knees of a seated occupant and to aid in cushioning and directing the knees. The knee bolster also provides energy management of a lower torso of the occupant and load transmission to other members, for example, energy absorption brackets and the support structure for the instrument panel (IP).

Typically, these knee bolsters are made either of a steel/plastic or thermoset material. In the steel/plastic knee bolster, an energy absorbing steel liner is assembled to a plastic cover. In the thermoset knee bolster, a thick compression molded cover having ribs transfers the knee loads to the energy absorption brackets between the knee bolster and a support structure for the instrument panel.

Although the above knee bolsters have worked well, it is desirable to provide a one-piece knee bolster that is completely recyclable. It is also desirable to provide a one-piece knee bolster that is low cost and lightweight. It is still desirable to control the stiffness of a one-piece knee bolster. At the same time, it is further desirable to provide a one-piece knee bolster, which is nice to touch and feel and has a class "A" fit, finish and aesthetic.

SUMMARY OF THE INVENTION

Accordingly, the present invention is a one-piece knee bolster for a motor vehicle including a knee bolster cover adapted to mount to vehicle structure in an interior of a motor vehicle and at least one hollow reinforcing channel member extending along the knee bolster cover to reinforce the knee bolster cover.

One advantage of the present invention is that a new one-piece knee bolster is provided for a motor vehicle having integral reinforcing channels to reinforce the knee bolster. Another advantage of the present invention is that the one-piece knee bolster is recyclable compared to thermoset materials. Yet another advantage of the present invention is that the one-piece knee bolster has reduced weight and fewer parts compared to steel/plastic knee bolsters. Still another advantage of the present invention is that the one-piece knee bolster has hollow reinforcing channels which can be varied in size and number to provide a wide range of stiffness for a knee bolster cover. A further advantage of the present invention is that the hollow reinforcing channels on the one-piece knee bolster eliminate shrinkage related problems (sink marks) found in similarly ribbed knee bolsters, yielding a class "A" surface. Yet a further advantage of the present invention is that the one-piece knee bolster allows for adequate steering column stroke. Still a further advantage of the present invention is that the one-piece knee bolster has a relatively low cost.

Other features and advantages of the present invention will be readily appreciated, as the same becomes better understood after reading the subsequent description when taken in conjunction with the accompanying drawings.

BRIEF DESCRIPTION OF THE DRAWINGS

FIG. 4 is a sectional view taken along line 4—4 of FIG. 2.

DESCRIPTION OF THE PREFERRED EMBODIMENT(S)

Figure 1:
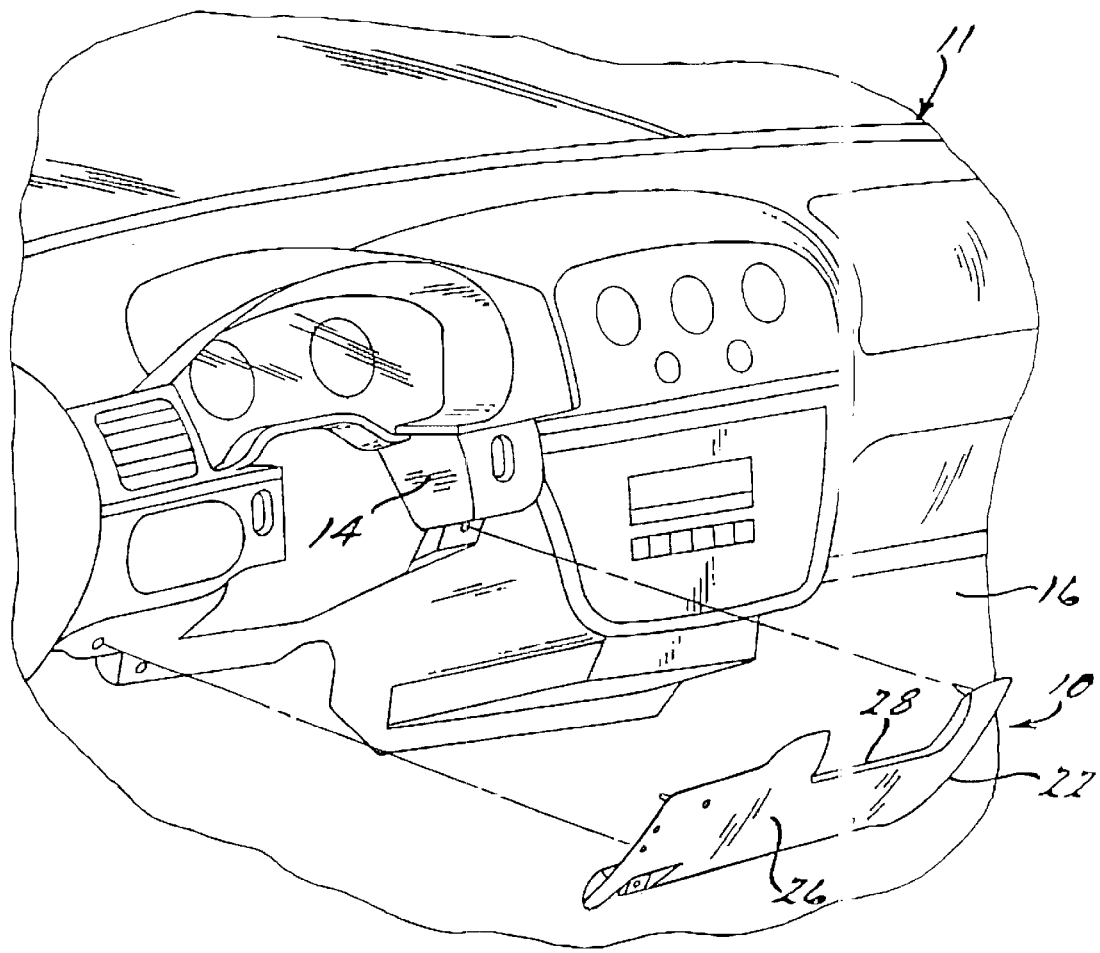
FIG. 1 is an exploded perspective view of a one-piece knee bolster, according to the present invention, illustrated in operational relationship with an instrument panel of a motor vehicle.
Figure 2:
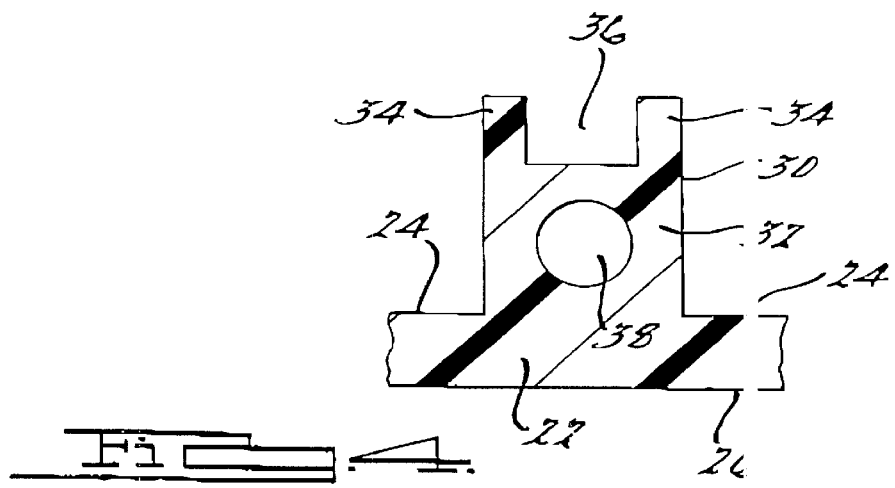
FIG. 2 is a perspective view of the one-piece knee bolster of FIG. 1 illustrated with a reinforcement.
Figure 2:
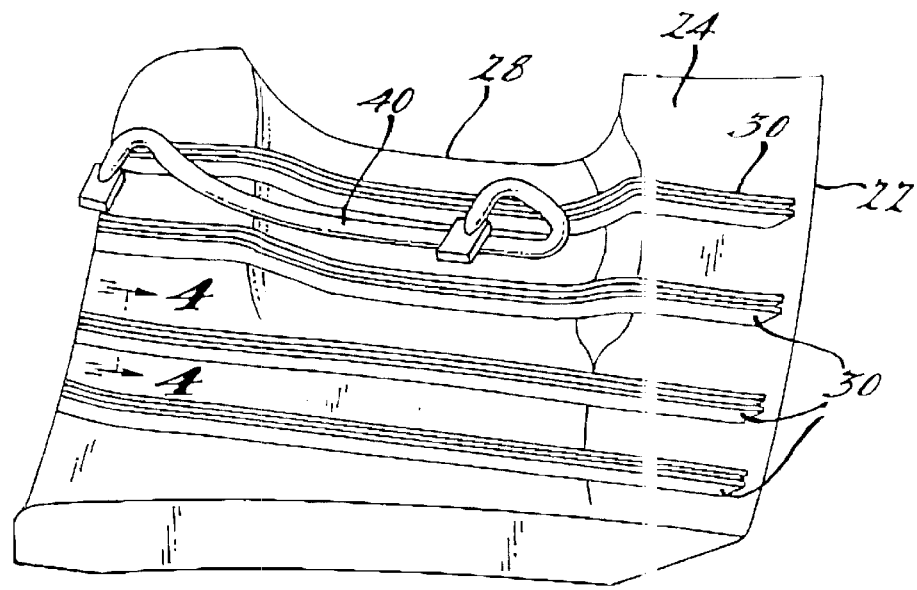

Referring now to the drawings and in particular FIGS. 1 and 2, one embodiment of a one-piece knee bolster 10, according to the present invention, is shown for a motor vehicle, generally indicated at 11. The one-piece knee bolster 10 is adapted to mount to vehicle structure such as an instrument panel 14 in an interior or occupant compartment 16 of the motor vehicle 11. The one-piece knee bolster 10 can be employed to mount any number of places on the motor vehicle 11 to provide a first contact surface for knees of a seated occupant (not shown) and to aid in cushioning and directing the knees of the occupant in the motor vehicle 11. To that end, the specific location of the one-piece knee bolster 10 shown in FIG. 1 is for purposes of illustration and not by way of limitation.

In the occupant compartment 16 of the motor vehicle 11, the one-piece knee bolster 10 helps to define the interior of the occupant compartment 16 and is often referred to as class "A" surface. Class "A" surfaces must meet strict aesthetic requirements, including requirements for fit and finish of the motor vehicle 11. Thus, in the environment depicted in the drawings, the one-piece knee bolster 10 is mounted by suitable fasteners such as clips or screws (not shown) to one side of the instrument panel 14 on the motor vehicle 11. It should be appreciated that the instrument panel 14 is conventional and known in the art.

Figure 3:
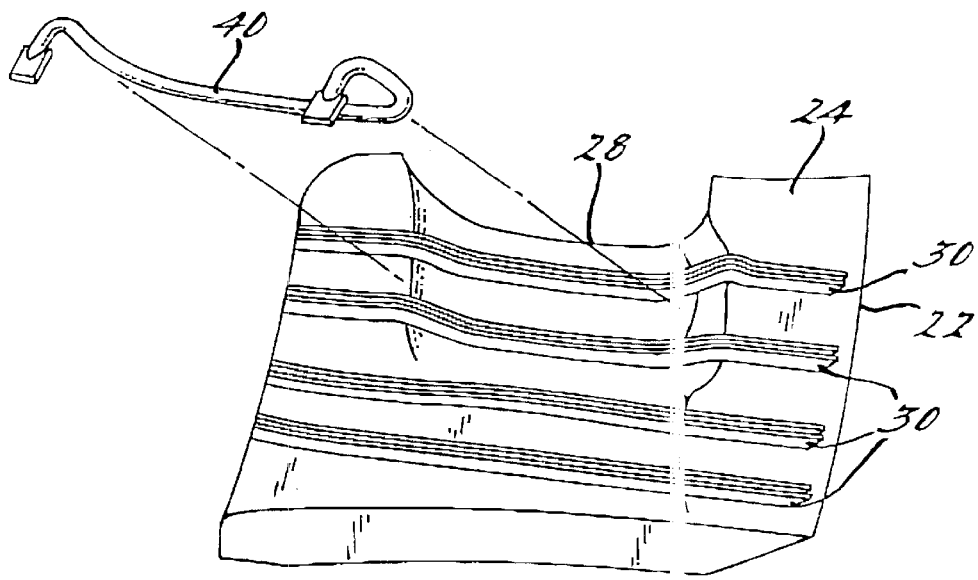
FIG. 3 is an exploded view of the one-piece knee bolster and reinforcement of FIG. 2.

Referring to FIGS. 1 through 3, the one-piece knee bolster 10 includes a knee bolster cover 22 having a front surface 24 and a rear surface 26. The knee bolster cover 22 is generally rectangular in shape and includes a cutout 28 for a steering column (not shown) to extend through when the one-piece knee bolster 10 is attached to the instrument panel 14. The knee bolster cover 22 is made of a thermoplastic resin material such as unfilled polycarbonate or polypropylene. It should be appreciated that the knee bolster cover 22 is recyclable.

Referring to FIGS. 2 through 4, the one-piece knee bolster 10 also includes at least one, preferably a plurality of reinforcing channel members 30 integrally molded to the knee bolster cover 22. The reinforcing channel members 30 extend transversely along the front surface 24 of the knee bolster cover 22 and are spaced longitudinally or vertically. Preferably, a plurality of reinforcing channel members 30 are spaced along the front surface 24 of the knee bolster cover 22. The reinforcing channel members 30 each have a generally rectangular base 32 extending longitudinally. The reinforcing channel members 30 each have a pair of opposed upper flanges 34 extending upwardly from the base 32 to form a channel 36 therebetween. The reinforcing channel members 30 each have a passageway 38 extending longitudinally through the base 32 such that the reinforcing channel members 30 are hollow. The passageway 38 is generally circular in shape, but not limited to that shape. The reinforcing channel members 30 are made of a thermoplastic resin material, preferably the same thermoplastic resin material as the knee bolster cover 22. It should be appreciated that the reinforcing channel members 30 may have any suitable shape, but must be hollow to achieve weight reduction. It should also be appreciated that the knee bolster cover 22 and reinforcing channel members 30 are integral, unitary and formed as one-piece.

The one-piece knee bolster 10 can be designed so as to dispose a reinforcement 40 between the pair of reinforcing channel members 30 closest to the cut-out 28 of the knee bolster cover 22. The reinforcement 40 is generally U-shaped and made of a metal material such as steel. The reinforcement 40 is prevented from sliding against the knee bolster cover 22 by capturing it between two of the reinforcing channel members 30 as illustrated in FIG. 2. It should be appreciated that, by capturing the reinforcement 40, the reinforcement 40 is prevented from bending, thus providing desired retention of the reinforcement 40 and aiding in steering column isolation.

To form the one-piece knee bolster 10, the reinforcing channel members 30 are molded in the front surface 24 of the knee bolster cover 22 to be integral. This may be achieved, for example, by utilizing conventional gas assist injection molding processes which eliminates shrinkage related problems such as sink marks and allows the knee bolster cover 22 and reinforcing channel members 30 to be molded in color or painted to yield a class "A" surface.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A one-piece knee bolster assembly for a motor vehicle comprising:

a knee bolster cover made of a thermoplastic resin material adapted to mount in an interior of a motor vehicle having a generally smooth rear surface and a front surface forming a plurality of frontwardly projecting reinforcing channel members integrally molded with said cover extending transversely, each of said channels having a generally rectangular base, first and second upwardly extending opposed flanges, and an internal hollow passageway extending longitudinally through the base; and a generally U-shaped metal reinforcement extending horizontally and adapted to be affixed to said vehicle and captured by said knee bolster cover in a region between a pair of adjacent reinforcing channel members, whereby said reinforcement is prevented from sliding against said knee bolster cover in the event of a vehicle impact.

2. A one-piece knee bolster as set forth in claim 1 wherein said thermoplastic resin material is unfilled polycarbonate or polypropylene.

* * * * *